US011294268B1

(12) United States Patent
Kuang

(10) Patent No.: US 11,294,268 B1
(45) Date of Patent: Apr. 5, 2022

(54) OPTICAL PROJECTION DEVICE FOR HOUSEHOLD PROJECTORS

(71) Applicant: Jing Li, Guangxi (CN)

(72) Inventor: Chengguo Kuang, Hunan (CN)

(73) Assignee: Jing Li, Pingnan County (CN)

( * ) Notice: Subject to any disclaimer, the term of this patent is extended or adjusted under 35 U.S.C. 154(b) by 0 days.

(21) Appl. No.: 17/407,679

(22) Filed: Aug. 20, 2021

(30) Foreign Application Priority Data

Jul. 16, 2021 (CN) .......................... 202121619590.8

(51) Int. Cl.
*G03B 21/14* (2006.01)
*G03B 21/20* (2006.01)
*G03B 21/00* (2006.01)

(52) U.S. Cl.
CPC ......... *G03B 21/208* (2013.01); *G03B 21/006* (2013.01); *G03B 21/2033* (2013.01)

(58) Field of Classification Search
CPC .... G03B 21/14; G03B 21/147; G03B 21/006; G03B 21/005; G03B 21/008
USPC ........................................ 353/37, 38, 31, 34
See application file for complete search history.

(56) References Cited

U.S. PATENT DOCUMENTS

| | | | | |
|---|---|---|---|---|
| 2020/0341353 A1* | 10/2020 | Guo | ...................... | G02B 27/283 |
| 2021/0109431 A1* | 4/2021 | Guo | ................... | G03B 21/2033 |
| 2021/0109434 A1* | 4/2021 | Guo | ...................... | G03B 21/006 |
| 2021/0124242 A1* | 4/2021 | Guo | ................... | G03B 21/2033 |
| 2021/0302811 A1* | 9/2021 | Guo | ................... | G03B 21/2033 |

\* cited by examiner

*Primary Examiner* — William C. Dowling
(74) *Attorney, Agent, or Firm* — Muncy, Geissler, Olds & Lowe, P.C.

(57) ABSTRACT

The invention discloses an optical projection device for household projectors, comprising light source, light-concentrating component, liquid crystal display and imaging component, wherein light source, light-concentrating component, liquid crystal display and imaging component are arranged in a coaxial arrangement; the light-concentrating component comprises a first lens and a second lens; the imaging component comprises a third lens, a fourth lens and a fifth lens arranged side by side and coaxially in sequence. Compared with the prior art, in the invention, the light can be concentrated on the liquid crystal display by arranging the first lens and the second lens side by side and coaxially, and evenly illuminate the liquid crystal display; the first lens and the second lens are set as high-order aspherical lens members, which can realize the miniaturization of optical projection device and improve the image quality of household projectors, and thereby effectively improving user experience.

6 Claims, 1 Drawing Sheet

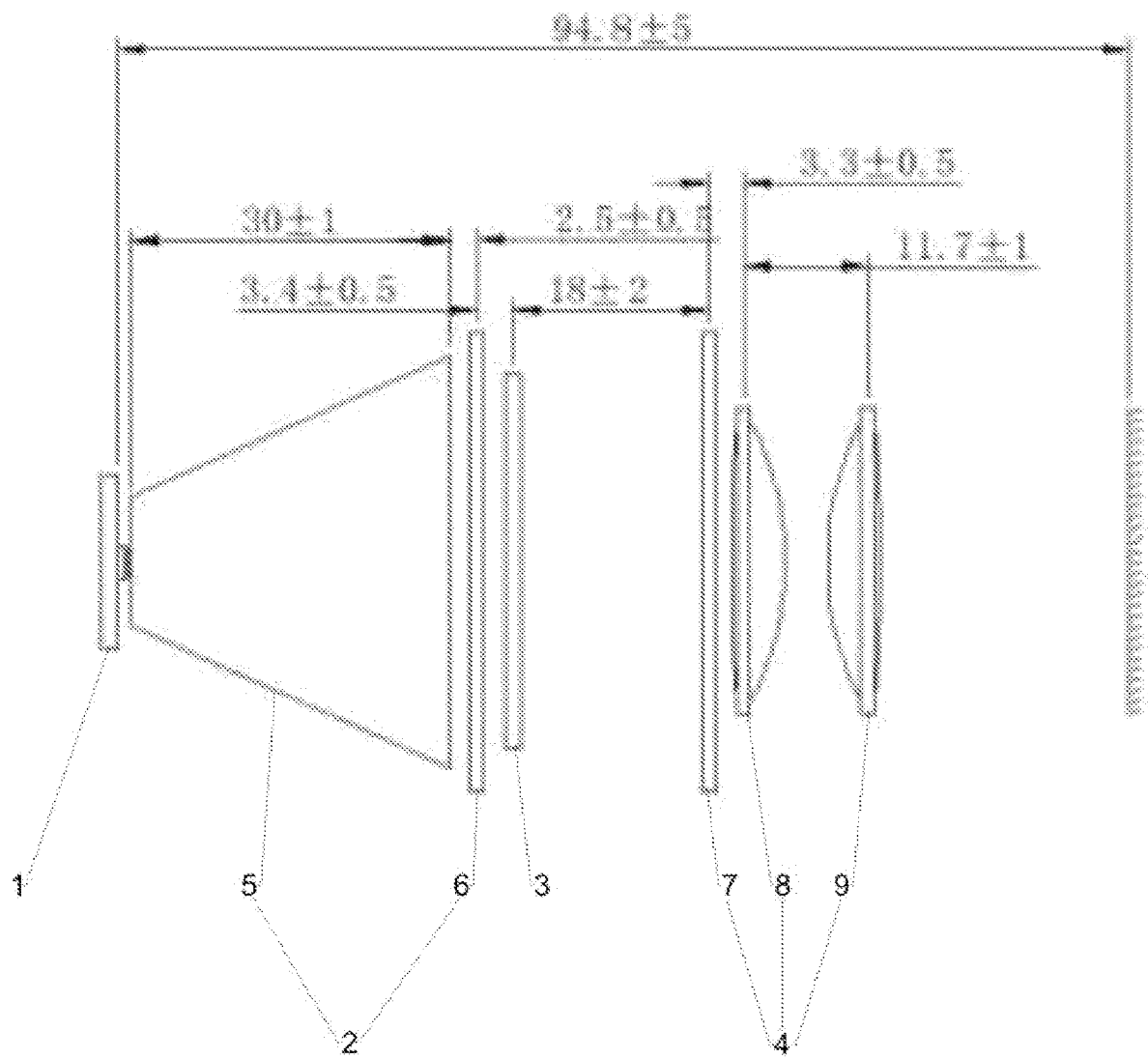

OPTICAL PROJECTION DEVICE FOR HOUSEHOLD PROJECTORS

BACKGROUND OF THE INVENTION

1. Field of the Invention

The invention relate to the technical field of the household projectors, in particular to an optical projection device for household projectors.

2. Description of the Related Art

In recent years, the projector market has developed rapidly. With the continuous improvement of the quality of life, the demand for household projectors from many families continues to grow, household projectors are developing in the direction of miniaturization, portability, entertainment, and practicality, and coming closer to life and entertainment; the future household projection market has huge potential, and the main uses thereof include children's learning, small offices, and personal entertainment. However, the optical projection devices of the existing household projectors are large in size, and do not have portability and miniaturization.

Therefore, the technical problems reflected above are urgent problems to be solved by those skilled in the art.

SUMMARY OF THE INVENTION

The purpose of the invention is to provide an optical projection device for household projectors, which aims to solve the problem that the existing optical projection devices for household projectors in the prior art are large in size, do not have portability and miniaturization, and at the same time the technical problem of improving projection imaging sharpness.

In order to achieve above object, the invention adapts following technical schemes: an optical projection device for household projectors, comprising light source, light-concentrating component, liquid crystal display and imaging component, wherein the light source, the light-concentrating component, the liquid crystal display and the imaging component are arranged in a coaxial arrangement;

The light-concentrating component comprises a first lens and a second lens, the first lens is arranged between the light source and the liquid crystal display, the second lens is arranged between the first lens and the liquid crystal display, the first lens is a reflecting cup condenser lens, the length of lens is 30±1 mm, the second lens is Fresnel lens, the texture of the second lens faces the liquid crystal display, and the first lens and the second lens are high-order aspherical lens members;

The imaging component comprises a third lens, a fourth lens and a fifth lens which are arranged side by side and coaxially in sequence, the liquid crystal display is arranged on one side of the third lens, the fourth lens and the fifth lens are both arranged on the other side of the third lens away from the liquid crystal display, and the third lens is Fresnel lens, the texture of the third lens faces the liquid crystal display, the fourth lens and the fifth lens are both convex lenses.

As an improvement, light-emitting surface of the first lens faces the direction of the second lens, and the space between the light-emitting hole plane of the first lens and the second lens is 2.5±0.5 mm.

As an improvement, the space between the third lens and the liquid crystal display is 18±2 mm, the space between the third lens and the fourth lens is 3.3±0.5 mm, the space between the fourth lens and the fifth lens is 11.7±1 mm.

As an improvement, a convex surface of the fourth lens faces the direction of the fifth lens, and a convex surface of the fifth lens faces the direction of the fourth lens.

As an improvement, the first lens, the second lens, the third lens, the fourth lens and the fifth lens are all optical plastics parts.

As an improvement, the light source is LED lamp.

Compared with the prior art, the invention has the following advantageous effects: the optical projection device for household projectors provided in the invention, can display the image projected by the household projector by arranging a light-concentrating component, a liquid crystal display and an imaging component; the light-concentrating component comprises the first lens and the second lens arranged side by side and coaxially, and the light can be concentrated on the liquid crystal display through the cooperation of the first lens and the second lens, and evenly illuminate the liquid crystal display. The first lens and the second lens are set as high-order aspherical lens members, on the one hand, the high-order aspherical lens members are lighter and thinner than ordinary lenses, which can shorten the length of the light-concentrating component, thereby realizing the miniaturization of optical projection device for household projectors; on the other hand, high-order aspherical lens members facilitates to correct high-order aberrations, thereby improving the image quality of household projectors, and effectively improving user experience.

BRIEF DESCRIPTION OF ACCOMPANYING DRAWINGS

The FIGURE shows the structure of the optical projection device for household projectors in the invention.

In the drawing: 1 refers to light source, 2 refers to light-concentrating component, 3 refers to liquid crystal display, 4 refers to imaging component, 5 refers to first lens, 6 refers to second lens, 7 refers to third lens, 8 refers to fourth lens, 9 refers to fifth lens.

SPECIFIC EMBODIMENTS OF THE INVENTION

Embodiments of the invention are described in detail below, examples of which are shown in the accompanying drawings, where identical or similar labels from beginning to end represent identical or similar elements or elements having the same or similar functions. In the description of the invention, it should be understood that, the terms "upper", "lower", "front", "rear", "left", "right", "inside" and "outside", "vertical", indicate a location or position relations based on the location or position shown in the appended drawings, and the terms only aim to facilitate the description of the invention and simplified description, and are not indicated or implied that the device or element referred to must have a specific orientation, be constructed and operated in a specific orientation, therefore they cannot be understood as a limitation of the invention.

Combined with the FIGURE, an optical projection device for household projectors, comprising light source 1, light-concentrating component 2, liquid crystal display 3 and imaging component 4, wherein the light source 1, the light-concentrating component 2, the liquid crystal display 3 and the imaging component 4 are arranged in a coaxial arrangement. The invention can display the image projected by the household projector by arranging a light-concentrating component 2, a liquid crystal display 3 and an imaging component 4; the light-concentrating component 2 comprises the first lens 5 and the second lens 6 arranged side by side and coaxially, and the light can be concentrated on the liquid crystal display 3 through the cooperation of the first lens 5 and the second lens 6, and evenly illuminate the liquid crystal display 3. The first lens 5 and the second lens 6 are set as high-order aspherical lens members, on the one hand, the high-order aspherical lens members are lighter and thinner than ordinary lenses, which can shorten the length of the light-concentrating component 2, thereby realizing the miniaturization of optical projection device for household projectors; on the other hand, high-order aspherical lens members facilitates to correct high-order aberrations, thereby improving the image quality of household projectors, and effectively improving user experience.

In the embodiment, the light-concentrating component 2 comprises a first lens 5 and a second lens 6, the first lens 5 is arranged between the light source 1 and the liquid crystal display 3, the second lens 6 is arranged between the first lens 5 and the liquid crystal display 3, the first lens 5 is a reflecting cup condenser lens, the length of lens is 30±1 mm, the second lens 6 is Fresnel lens, the texture of the second lens 6 faces the liquid crystal display 3, and the first lens 5 and the second lens 6 are high-order aspherical lens members. In this way, when light from the light source 1 is emitted, the light first passes through the first lens 5 and emits out from the light-emitting surface of the first lens 5 in a horizontal direction by the first lens 5, and then the light is refracted through the second lens 6 and transmitted to the liquid crystal display 3, thereby achieving the function of correcting high-order aberrations and improving the image quality of household projectors.

In the embodiment, the imaging component 4 comprises a third lens 7, a fourth lens 8 and a fifth lens 9 which are arranged side by side and coaxially in sequence, the liquid crystal display 3 is arranged on one side of the third lens 7, the fourth lens 8 and the fifth lens 9 are both arranged on the other side of the third lens 7 away from the liquid crystal display 3, and the third lens 7 is Fresnel lens, the texture of the third lens 7 faces the liquid crystal display 3, the fourth lens 8 and the fifth lens 9 are both convex lenses. The invention can magnify the light projected from the liquid crystal display 3 by arranging the third lens 7, the fourth lens 8 and the fifth lens 9 arranged side by side and coaxially, thereby the user can observe with the naked eye. In addition, by using high-order aspherical convex lenses as the fourth lens 8 and fifth lens 9, the thickness of the fourth lens 8 and fifth lens 9 can be effectively reduced, the high-order optical aberrations can be effectively corrected, and the definition of household projector can be improved.

Further, the light-emitting surface of the first lens 5 faces the direction of the second lens 6, and the space between the light-emitting hole plane of the first lens 5 and the second lens 6 is 2.5±0.5 mm.

Further, the space between the third lens 7 and the liquid crystal display 3 is 18±2 mm, the space between the third lens 7 and the fourth lens 8 is 3.3±0.5 mm, the space between the fourth lens 8 and the fifth lens 9 is 11.7±1 mm.

Further, a convex surface of the fourth lens 8 faces the direction of the fifth lens 9, and a convex surface of the fifth lens 9 faces the direction of the fourth lens 8.

Further, the first lens 5, the second lens 6, the third lens 7, the fourth lens 8 and the fifth lens 9 are all optical plastics parts. Optical plastics have good plasticity, light weight and low cost, therefore the first lens 5, the second lens 6, the third lens 7, the fourth lens 8 and the fifth lens 9 also have characteristics of good plasticity, light weight and low cost, and can effectively control the production cost of household projector. In addition, because the first lens 5, the second lens 6, the third lens 7, the fourth lens 8 or the fifth lens 9 may be damaged after a long time of use, thereby it is necessary to replace the damaged parts, and by using optical plastics, the replacement cost is greatly reduced, and the cost of reuse of the product is effectively reduced.

Further, the light source 1 is LED lamp. Of course, in other embodiments of the invention, the light source 1 can also be other alternatives, and there is no unique restriction here.

The above description of the invention and embodiments is not restricted, and what is shown in the attached drawings is only one of the embodiment of the invention, and the actual structure is not limited thereto. In a word, if the ordinary technical personnel skilled in the art are inspired by the invention, without separating from the purpose of creation of the invention, and without creatively designing the structure and embodiments similar to the technical scheme, they shall belong to the protection scope of the utility model.

The invention claimed is:

1. An optical projection device for household projectors, comprising light source, light-concentrating component, liquid crystal display and imaging component, wherein the light source, the light-concentrating component, the liquid crystal display and the imaging component are arranged in a coaxial arrangement;
    the light-concentrating component comprises a first lens and a second lens, the first lens is arranged between the light source and the liquid crystal display, the second lens is arranged between the first lens and the liquid crystal display, the first lens is a reflecting cup condenser lens, the length of lens is 30±1 mm, the second lens is Fresnel lens, the texture of the second lens faces the liquid crystal display, and the first lens and the second lens are high-order aspherical lens members;
    the imaging component comprises a third lens, a fourth lens and a fifth lens which are arranged side by side and coaxially in sequence, the liquid crystal display is arranged on one side of the third lens, the fourth lens and the fifth lens are both arranged on the other side of the third lens away from the liquid crystal display, and the third lens is Fresnel lens, the texture of the third lens faces the liquid crystal display, the fourth lens and the fifth lens are both convex lenses.

2. The optical projection device for household projectors of claim 1, wherein light-emitting surface of the first lens faces the direction of the second lens, and the space between the light-emitting hole plane of the first lens and the second lens is 2.5±0.5 mm.

3. The optical projection device for household projectors of claim 2, wherein the space between the third lens and the liquid crystal display is 18±2 mm, the space between the third lens and the fourth lens is 3.3±0.5 mm, the space between the fourth lens and the fifth lens is 11.7±1 mm.

4. The optical projection device for household projectors of claim 3, wherein a convex surface of the fourth lens faces the direction of the fifth lens, and a convex surface of the fifth lens faces the direction of the fourth lens.

5. The optical projection device for household projectors of claim 4, wherein the first lens, the second lens, the third lens, the fourth lens and the fifth lens are all optical plastics parts.

6. The optical projection device for household projectors of claim 5, the light source is LED lamp.

* * * * *